United States Patent [19]

Lang et al.

[11] Patent Number: 5,137,247
[45] Date of Patent: Aug. 11, 1992

[54] HOLDING DEVICE FOR AN EXTERNAL REAR-VIEW MIRROR FOR A COMMERCIAL VEHICLE

[75] Inventors: Heinrich Lang, Ergersheim; Wolfgang Seiboth, Windsheim, both of Fed. Rep. of Germany

[73] Assignee: Mekra Rangau Plastics GmbH & Co. KG, Fed. Rep. of Germany

[21] Appl. No.: 745,171

[22] Filed: Aug. 15, 1991

Related U.S. Application Data

[63] Continuation-in-part of Ser. No. 675,510, Mar. 27, 1991, abandoned.

[30] Foreign Application Priority Data

Mar. 29, 1990 [DE] Fed. Rep. of Germany ....... 4010084

[51] Int. Cl.⁵ .......................................... F16M 13/00
[52] U.S. Cl. ..................................... 248/549; 248/900; 350/632
[58] Field of Search ............... 248/549, 480, 476, 479, 248/485, 487, 900, 478, 477, 475.1, 486; 403/120, 121; 350/632, 636

[56] References Cited

U.S. PATENT DOCUMENTS

| | | |
|---|---|---|
| 2,856,816 | 10/1958 | Ross . |
| 3,107,077 | 10/1963 | Lassa . |
| 4,218,036 | 8/1980 | Pitkanen ........................ 248/900 X |
| 4,523,735 | 6/1985 | Beck .............................. 248/479 X |
| 4,606,619 | 8/1986 | Yamana . |
| 4,623,115 | 11/1986 | Brester . |
| 4,728,181 | 3/1988 | Kikinuma . |
| 4,786,156 | 11/1988 | Kotani . |
| 4,789,232 | 12/1988 | Urbanek . |
| 5,005,797 | 4/1991 | Maekawa . |

FOREIGN PATENT DOCUMENTS

| | | |
|---|---|---|
| 1240429 | 7/1962 | Fed. Rep. of Germany ...... 248/900 |
| 2239853 | 2/1974 | Fed. Rep. of Germany . |
| 123169 | 12/1975 | German Democratic Rep. . |
| 2714056 | 3/1977 | Fed. Rep. of Germany ...... 248/900 |
| 8004330 | 2/1980 | Fed. Rep. of Germany . |
| 3330952 | 12/1984 | Fed. Rep. of Germany ...... 350/632 |
| 3628454 | 3/1988 | Fed. Rep. of Germany . |
| 2594392 | 8/1987 | France ................................ 350/632 |
| 803995 | 11/1958 | United Kingdom ................ 248/900 |

Primary Examiner—J. Franklin Foss
Attorney, Agent, or Firm—Laff, Whitesel, Conte & Saret

[57] ABSTRACT

A holding device for an external rear-view mirror for a commercial vehicle has a support arm arranged on a pillow block in a manner pivotable about a pivot axis. In order to allow a free shifting of the mirror by pivoting of the support arm, the support arm is pivotable against a friction moment relative to the pillow block upon release of an elastic locking connection.

21 Claims, 4 Drawing Sheets

HOLDING DEVICE FOR AN EXTERNAL REAR-VIEW MIRROR FOR A COMMERCIAL VEHICLE

This is a continuation-in-part of our application Ser. No. 07/675,510 filed Mar. 27, 1991, now abandoned.

FIELD OF THE INVENTION

The invention relates to a holding device for an external rear-view mirror for a commercial vehicle with a support arm, of which one end is provided with a mirror and of which the other end is arranged on a pillow block, which is connectable with the commercial vehicle, in a manner pivotable about a pivot axis.

BACKGROUND OF THE INVENTION

External rear-view mirrors of the generic type are pivotably secured to a pillow block by way of support arms; the pillow block is fastened to the cabin of a commercial vehicle. External mirrors must comply with the requirement of being able to completely shift forwards or backwards whenever an obstacle is met.

SUMMARY OF THE INVENTION

It is an object of the invention to embody a holding device of the generic kind in such a way that a complete shifting of the mirror is ensured when it meets an obstacle.

This object is achieved in accordance with the invention by the features that the support arm is pivotable against a friction moment relative to the pillow block upon release of an elastic locking connection, which locking connection comprises a locking nose and a locking recess engaging with one another and formed on a component part stationary relative to the pillow block and on a component part displaceable relative to the pillow block in the direction of the pivot axis against the force of a compression spring. By the measures according to the invention it is achieved that the support arm is adjustable relative to the pillow block against a friction moment. When meeting an obstacle the mirror can be pivoted beyond its usual position upon release of the elastic locking connection, which is very simple. Whenever commericial vehicles are mentioned in this context, this primarily concerns trucks and buses, but also other vehicles.

It may be advantageous when the support arm is pivotable relative to the pillow block between two stop positions, and when the support arm is pivotable relative to the pillow block beyond these stop positions upon release of said elastic locking connection. The two mentioned stop positions may for example relate to the normal position during driving and to a parking position, in which the mirror is protected by being pivoted in a direction towards the cabin. When meeting an obstacle the mirror can be pivoted beyond the stop positions upon releasing of the elastic locking connection. Reverse pivoting will again close the locking connection making possible the pivoting between two defined stop positions.

Further advantages, features and details of the invention will become apparent from the ensuing description of two examples of embodiment taken in conjunction with the drawings.

DESCRIPTION OF THE PREFERRED EMBODIMENT

Figure 1:
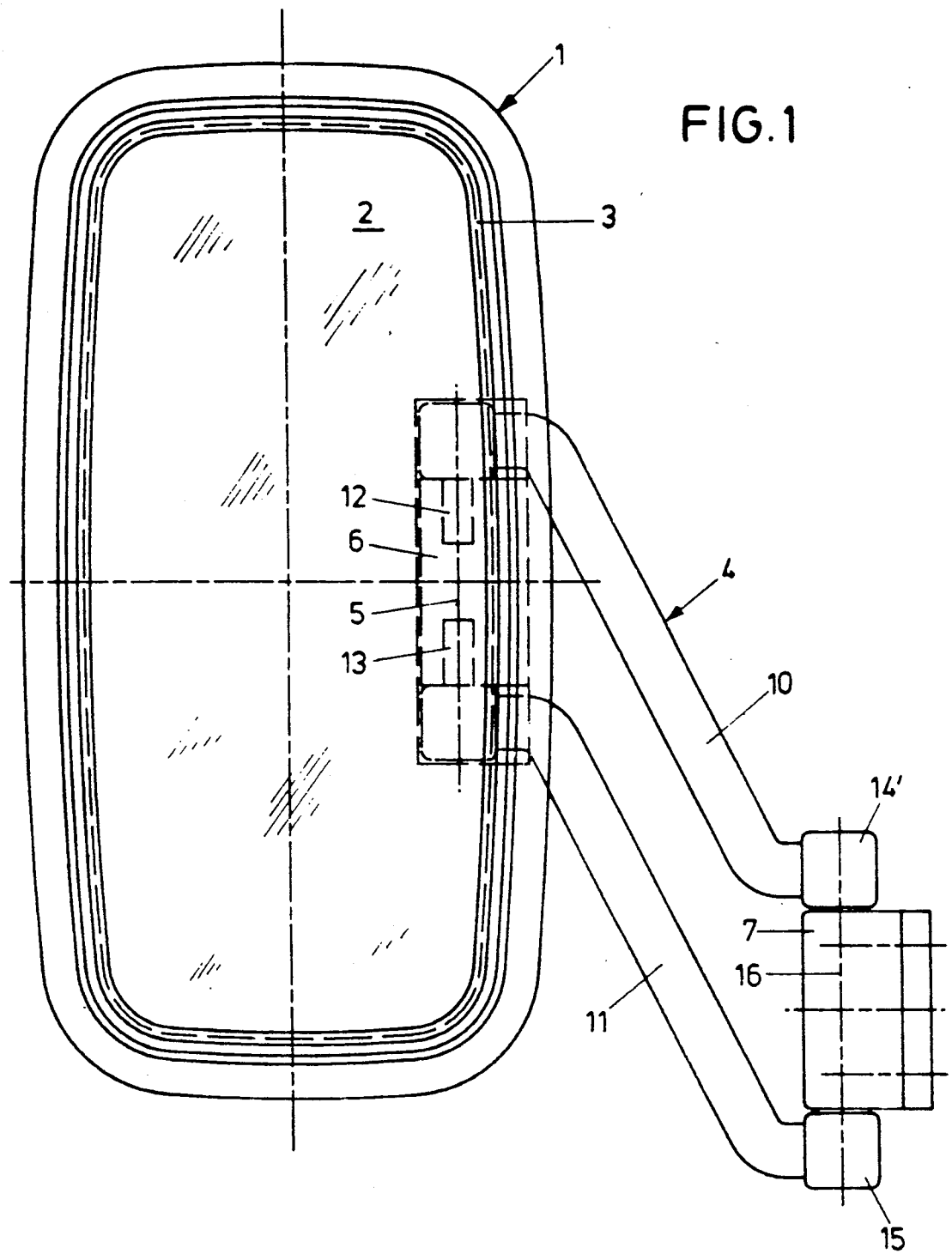
FIG. 1 is a top view of a mirror with support arm and pillow block.

FIG. 1 shows a rear-view mirror, which is an external rear-view mirror for a commercial vehicle. This mirror has a housing 1, in which a mirror glass 2 is retained by means of a retaining frame 3. A double-armed support arm 4 is arranged on the housing 1 in a manner pivotable about an axis 5 by means of a clamp 6.

At its other end the support arm 4 is pivotably secured to a pillow block 7, which can in turn be attached to the cabin of a commercial vehicle. It rests with an attachment surface 8 against the cabin not shown, where it is fastened by means of screws screwed into the threaded holes 9 of the pillow block 7.

The double-armed support arm 4 comprises an upper support arm 10 and a lower support arm 11, which are associated with or facing one another in pairs. At their end facing the housing 1 they have pivots 12, 13, which are in alignment and concentric relative to the axis 5 and which are held in place on the housing 1 by means of the clamp 6. At their ends attached to the pillow block 7 they are provided with joints 14, 15, which are arranged on the pillow block 7 in a manner still to be described to be pivotable about a pivot axis 16. The pivot axis 16 and the axis 5 extend parallel to one another, i.e. the two support arms 10, 11 are in a common plane formed by the axis 5 and the pivot axis 16.

The pillow block 7 has a cylindrical inner chamber 17 extending concentrically to the pivot axis 16; this inner chamber 7 is closed by a wall section 18 of the pillow block 7 towards the joint 15 of the lower support arm 11. Towards the joint 14 of the upper support arm 10, this inner chamber is closed by a locking disk 19, which is fixed against an annular collar 20 on the inner chamber 17 axially in a direction towards the latter, and which is non-rotatably connected with the pillow block 7 relative to the pivot axis 16 by means of a groove-and-tongue connection 21. In a manner concentric relative to the pivot axis 16 the inner chamber 17 is passed through by a bolt 22 received in the joint 14 of the upper support arm 10 and connected with the latter by means of a pin 23 in a way not to rotate relative to the pivot axis 16. The bolt 22 passes through the joint 15 of the lower support arm 11. This joint 15 is braced against the pillow block 7 by means of a nut 25 screwed onto a threaded section 24 of the bolt 22. Friction disks 26, 27 are arranged between the joint 14 and the locking disk 19, on the one hand, and between the wall section 18 and the lower joint 15 and serve to produce a sufficiently high frictional force between the support arm 4 and the pillow block 7. The extent of this frictional force depends on how firmly the nut 25 is tightened on the threaded section 24 of the bolt 22, which is not only non-rotatably connected with the upper joint 14 by means of the pin 23, but which is also stationarily connected with it in the direction of the pivot axis 16.

A prestressed helical compression spring 28 surrounding the bolt 22 and bearing against the lower wall section 18 is arranged in the inner chamber 17, on the end of which spring facing away from the wall section 18 a support disk 29 is arranged, which is freely displaceable in the inner chamber 17 and on the bolt 22.

A locking sleeve 30 is arranged on the bolt 22 between the locking disk 19 and the support disk 29 and is firmly pressed against the locking disk 19 due to the prestressing of the compression spring 28 and is virtually clamped between the locking disk 19 and the support disk 29. On its side neighbouring the locking disk 19 the locking sleeve 30 has a locking recess 31, into which projects a locking nose 32 formed on the side of the locking disk 19 facing the locking recess 31. As shows FIG. 2, the nose 32 and the recess 31 have flanks 33, 34 strongly inclined relative to the direction of the pivot axis 16, so that the disk 19 and the sleeve 30 are forced apart in the direction of the pivot axis 16, when the locking sleeve 30 is rotated relative to the locking disk 19 about the pivot axis 16.

The locking sleeve 30 has a cut-out 35 on its side neighbouring the support disk 29. This cut-out 35 is passed through by a stop pin 36, which—as shows FIG. 3—passes through the bolt 22 in a direction perpendicular to the pivot axis 16 and of which the length about corresponds to the diameter of the inner chamber 17. This stop pin 36 is connected with the bolt 22 in non-rotatable manner, i.e. it rotates with the bolt 22 when the latter is pivoted relative to the pillow block 7 about the pivot axis 16. The cut-out 35 is such that the two ends of the stop pin 36 projecting from the bolt 22 are associated with stop surfaces 37, 38 on the locking sleeve 30.

Figure 3:
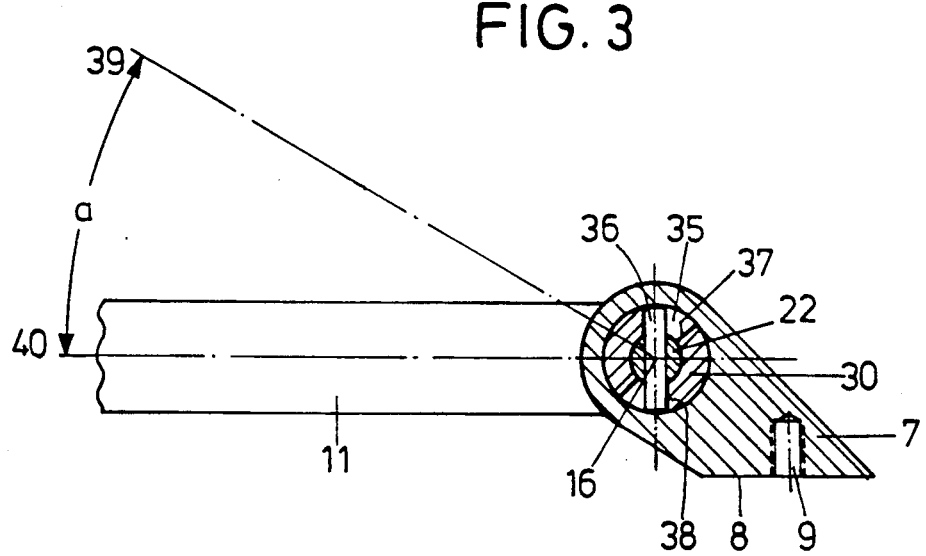
FIG. 3 is a cross-section through the pillow block according to section line III—III of FIG. 2.

As can equally be taken from FIG. 3, the support arm 4 can be pivoted relative to the pillow block 7 about the pivot axis 16 by an angle a, only the friction moment produced on the friction disks 26, 27 having to be overcome during this pivot movement. In this case the support arm 7 with the mirror is pivoted between two defined positions, in which either the stop surface 37 or the stop surface 38 bears against the stop pin 36. These two defined positions of the support arm 4 with the mirror relative to the pillow block 7 and thus to the cabin of the commercial vehicle can for example define a driving position, i.e. the normal operating position of the mirror, and the position when the vehicle is parked or cleaned, in which the mirror is partially pivoted towards the cabin.

When the support arm is pivoted in one of the two possible directions beyond this stop position, i.e. beyond the angle a, then the stop pin bearing against one of the stop surfaces 37 or 38 drives the locking sleeve 30 and rotates it relative to the locking disk 19, whereby the locking nose 32 is turned out of the locking recess 31 over the flanks 33 or 34. In this case the locking sleeve 30 is displaced against the force of the helical compression spring 28 in the direction towards the compression spring 28. A pivoting of the support arm towards the cabin defined by the support arm 4 bearing against the cabin is therefore not specific for the structure of the support arm 4 with pillow block 7. The possible travel c of the locking sleeve 30 on the bolt 22, i.e. the possible displacement path of the locking sleeve 30 on the bolt 22 in the direction of the pivot axis 16 is greater than the height d of the locking nose 32 relative to the locking disk 19 in the direction of the pivot axis 16. When the stop pin 36 serving as a driver bears against the stop surface 37, then the support arm 4 takes a defined stop position 39, whereas it takes a defined stop position 40 when the stop pin 36 bears against the stop surface 38. The two stop positions 39, 40 define two stop positions in which the support arm 4 is held free from play relative to the pillow block 7. In one direction it positively bears against the corresponding stop surface 37, 38. In the other direction it is held by the corresponding friction moment.

Figure 2:
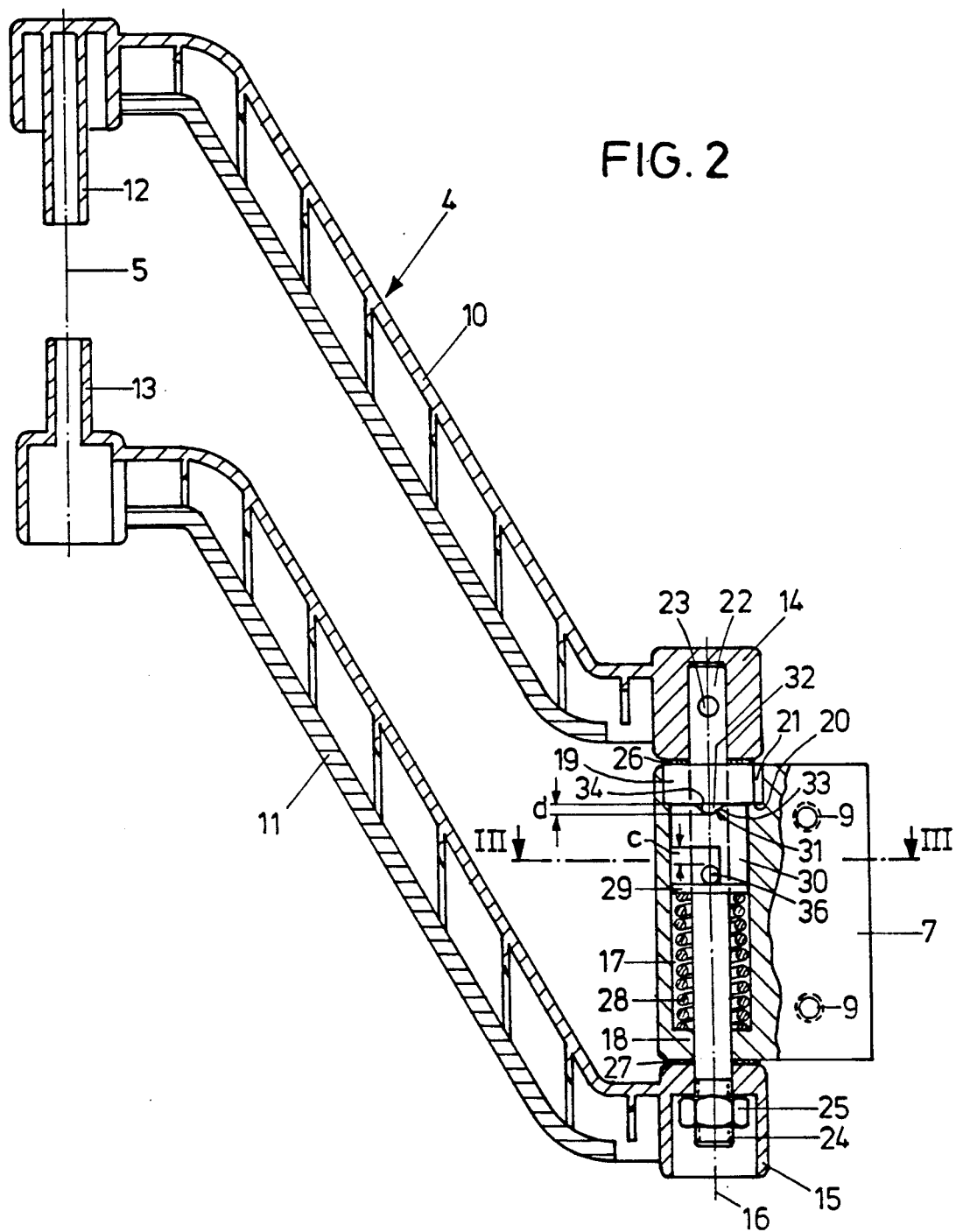
FIG. 2 is a section through the holding arm and the pillow block of a first embodiment of the invention.

As can be taken from FIG. 2, the support arms 10, 11 are hollow in shape, with in particular the lower support arm 11 being formed such that an electric line not shown can pass through it, which, invisible to the outside, is piloted through the pivot 13 into the housing 1.

Figure 4:
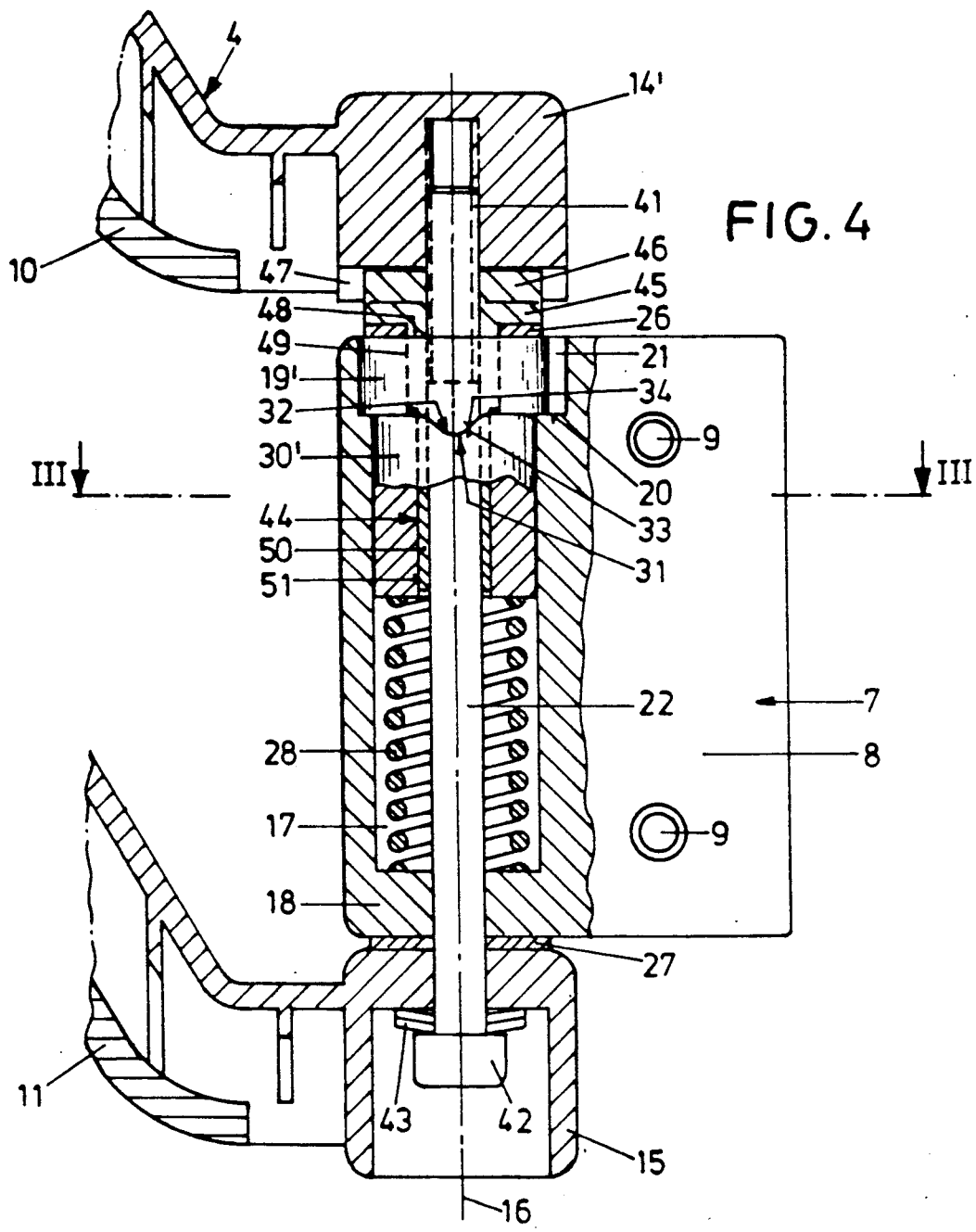
FIG. 4 is a section through a part of the holding arm and the pillow block of a second embodiment of the invention.
Figure 5:
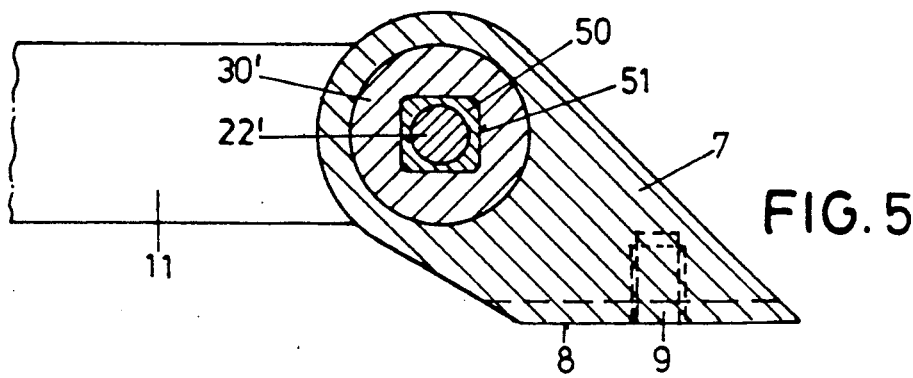
FIG. 5 is a cross-section through the pillow block according to section line V—V of FIG. 4.

In the description of the example of embodiment according to FIGS. 4 and 5 the same reference numerals are used for indentical parts. Parts that are identical in function, but slightly differ in construction, have the reference numerals of the example of embodiment according to FIGS. 1 to 3 provided with a prime. To this extent a renewed description is not necessary.

In the example of embodiment according to FIGS. 4 and 5 the inner chamber 17 is passed through by a bolt 22' concentrically of the pivot axis 16, which bolt 22' is screwed into the joint 14' of the upper support arm 10 by means of a thread 41. A head 42 of the bolt 22' arranged opposite the thread 41 bears against the joint 15 of the lower support arm 11 by way of disk springs 43, the joint 15 equally being passed through by the bolt 22'.

Friction disks 26, 27 are arranged between the joint 14' and the locking disk 19' on the one hand and between the wall section 18 and the lower joint 15 on the other hand and serve to produce a sufficiently high frictional force between the support arm 4 and the pillow block 7. The dimension of this frictional force depends on how far the bolt 22' is screwed with its thread 41 into the joint 14', i.e. how strongly the disk springs 43 are prestressed. The dimension of the frictional force thus corresponds to the force with which the disk springs 43 are prestressed.

A prestressed helical compression spring 28 surrounding the bolt 22' and bearing against the lower wall section 18 is arranged in the inner chamber 17 and bears against a locking sleeve 30' which is in turn freely displaceable in the direction of the pivot axis 16 in the inner chamber 17. Due to the prestressing of the compression spring 28 it is firmly pressed against the locking disk 19'.

On its side neighbouring the locking disk 19' the locking sleeve 30' has a locking recess 31, into which projects a locking nose 32 formed on the side of the locking disk 19' facing the locking recess 31. As seen in FIGS. 2, the locking nose 32 and the recess 31 have flanks 33, 34 strongly inclined relative to the direction of the pivot axis 16, so that the locking disk 19' and the locking sleeve 30' are forced apart in the direction of the pivot axis 16, when the locking sleeve 30' is rotated relative to the locking disk 19' about the pivot axis 16.

A driver sleeve 44 surrounding the bolt 22' is provided to ensure such rotating. At its end neighbouring the joint 14' it has a flange 45 with a tongue 46 on its side, which engages with a matching groove 47 provided at the side of the joint 14' facing the tongue 46. Radially to the pivot axis 16 this groove 47 passes throughout the circumference of the joint 14', so that mounting can be made by lateral insertion. The flange 45 also forms a stop surface for the friction disk 26. The flange is followed by a cylindrical guide section 48, which is guided for free rotation radially to the pivot axis 16 in a corresponding bore 49 in the locking disk 19'.

The guide section 48 is followed by a non-circular driving section 50—in the present case a square section as seen in FIG. 3—passing through the locking sleeve 30'. This driving section 50 is arranged in a recess 51 matching in cross-section and passing through the locking sleeve 30' in the direction of the axis 16, so that the driver sleeve 44 is non-rotatably connected with the locking sleeve 30', the latter however being displaceable in the direction of the axis 16 relative to the driver sleeve 44. When the support arm is pivoted about the pivot axis 16, then the driving section 50 of the driver sleeve 44 takes along the locking sleeve 30' and rotates the latter relative to the locking disk 19', the locking nose 32 thus being moved out of the locking recess 31 via the flanks 33 or 34. This causes the locking sleeve 30' to be displaced against the force of the helical compression spring 28 in the direction towards the compression spring 28.

For such a displacement a force acting on the friction disks 26, 27 must be overcome that is to some extent adjustable—as outlined. As a result of the adjustability of the static friction of the friction disks 26, 27 the vibrational stability of the mirror is high. Once this static friction has been overcome, tilting around the pivot axis 16 is comparatively easily feasible.

What is claimed is:

1. A holding device for an external rear-view mirror for a commercial vehicle with a support arm (4), of which one end is provided with a mirror and of which the other end is arranged on a pillow block (7), which is connectable with the commercial vehicle, in a manner pivotable about a pivot axis (16), wherein the support arm (4) is pivotable against a friction moment relative to the pillow block (7) upon release of an elastic locking connection, which locking connection comprises a locking nose (32) and a locking recess (31) engaging with one another and formed on a component part (19, 19') stationary relative to the pillow block (7) and on a component part (30, 30') displaceable relative to the pillow block (7) in the direction of the pivot axis (16) against the force of a compression spring (28), the support arm (4) is pivotable relative to the pillow block (7) between two stop positions (39, 40), and wherein the support arm (4) is pivotable relative to the pillow block (7) beyond these stop position (39,40) upon release of said elastic locking connection.

2. A holding device according to claim 1, wherein a driver (36) in connected with the support arm (4) in a non-rotatable manner, which driver is freely displaceable between the stop surfaces (37,38) on said component part (30) displaceable in the direction of the pivot axis (16) and relative to it, a stop position (39, 40) being formed by the driver (36) bearing against a stop surface (37, 38).

3. A holding device according to claim 2, wherein the component part displaceable in the direction of the pivot axis (16) is in the form of a locking sleeve (30), which is provided with a cut-out (35) defined by the stop surfaces (37, 38), into which cut-out (35) the driver (36) projects.

4. A holding device for an external rear-view mirror for a commercial vehicle with a support arm (4), of which one end is provided with a mirror and of which the other end is arranged on a pillow block (7), which is connectable with the commercial vehicle, in a manner pivotable about a pivot axis (16), wherein the support arm (4) is pivotable against a friction moment relative to the pillow block (7) upon release of an elastic locking connection, which locking connection comprises a locking nose (32) and a locking recess (31) engaging with one another and formed on a component part (19, 19') stationary relative to the pillow block (7) and on a component part (30, 30') displaceable relative to the pillow block (7) in the direction of the pivot axis (16) against the force of a compression spring (28), the support arm (4) is connected with the pillow block (7) by means of a bolt (22, 22'), on which said component part (30) displaceable in the direction of the pivot axis (16) is arranged and on which a driver (36, 44) is arranged.

5. A holding according to claim 4, wherein the support arm (4) is in the form of a double-armed support arm surrounding the pillow block (7) with a first joint (14) and a second joint (15) and wherein the bolt (22) is firmly connected with said first joint (14) and wherein said second joint (15) is braced relative to the pillow block (7) by means of a nut (25).

6. A holding device according to claim 4, wherein the support arm (4) is in the form of a double-armed support arm surrounding the pillow block (7) with a first joint (14') and a second joint (15) and wherein the bolt (22') is connected with the first joint (14') by means of a thread (41) and supported against the second joint (15) by means of at least one pretensioned spring (43).

7. A holding device according to claim 6, wherein the friction moment between the support arm (4) and the pillow block (7) is adjustable by means of the bolt (22').

8. A holding device according to claim 4, wherein the pillow block (7) has an inner chamber (17), in which the compression spring (28) and said component part (30, 30') displaceable in the direction of the pivot axis (16) are arranged.

9. A holding device according to claim 4, wherein at least one friction disk (26, 27) is arranged between the support arm (4) and the pillow block (7).

10. A holding device according to claim 4, wherein at least one friction disk (26, 27) is arranged between the support arm (4) and the pillow block (7) and wherein the friction moment between the support arm (4) and the pillow block (7) is adjustable by means of the bolt (22, 22').

11. A holding device according to claim 4, wherein the support arm (4) is in the form of a double-armed support arm surrounding the pillow block (7) with a first joint (14, 14') and a second joint (15).

12. A holding device according to claim 4, wherein a driver is non-rotatably connected with the support arm (4), on which driver (44) the displaceable component part (30') is guided in a manner to be non-rotatable but displaceable in the direction of the pivot axis (16).

13. A holding device for an external rear-view mirror for a commercial vehicle with a support arm (4), of which one end is provided with a mirror and of which the other end is arranged on a pillow block (7), which is connectable with the commercial vehicle, in a manner pivotable about a pivot axis (16), wherein the support arm (4) is pivotable against a friction moment relative to the pillow block (7) upon release of an elastic locking connection, which locking connection comprises a locking nose (32) an a locking recess (31) engaging with one another and formed on a component part (19, 19')

stationary relative to the pillow block (7) and on a component part (30, 30') displaceable relative to the pillow block (7) in the direction of the pivot axis (16) against the force of a compression spring (28) and, at least one friction disk (26, 27) is arranged between the support arm (4) and the pillow block (7).

14. A holding device according to claim 13, wherein the pillow block (7) has an inner chamber (17), in which the compression spring (28) and said component part (30, 30') displaceable in the direction of the pivot axis (16) are arranged.

15. A holding device according to claim 13, wherein the support arm (4) is in the form of a double-armed support arm surrounding the pillow block (7) with a first joint (14, 14') and a second joint (15).

16. A holding device according to claim 13, wherein a driver is non-rotatably connected with the support arm (4), on which driver (44) the displaceable component part (30') is guided in a manner to be non-rotatable but displaceable in the direction of the pivot axis (16).

17. A holding device for an external rear-view mirror for a commercial vehicle with a support arm (4), of which one end is provided with a mirror and of which the other end is arranged on a pillow block (7), which is connectable with the commercial vehicle, in a manner pivotable about a pivot axis (16), wherein the support arm (4) is pivotable against a friction moment relative to the pillow block (7) upon release of an elastic locking connection, which locking connection comprises a locking nose (32) and a locking recess (31) engaging with one another and formed on a component part (19, 19') stationary relative to the pillow block (7) and on a component part (30, 30') displaceable relative to the pillow block (7) in the direction of the pivot axis (16) against the force of a compression spring (28), the pillow block (7) has an inner chamber (17), in which the compression spring (28) and said component part (30, 30') displaceable in the direction of the pivot axis (16) are arranged, at least one friction disk (26, 27) is arranged between the support arm (4) and the pillow block (7) and wherein the friction moment between the support arm (4) and the pillow block (7) is adjustable by means of the bolt (22, 22').

18. A holding device for an external rear-view mirror for a commercial vehicle with a support arm (4), of which one end is provided with a mirror and of which the other end is arranged on a pillow block (7), which is connectable with the commercial vehicle, in a manner pivotable about a pivot axis (16), wherein the support arm (4) is pivotable against a friction moment relative to the pillow block (7) upon release of an elastic locking connection, which locking connection comprises a locking nose (32) and a locking recess (31) engaging with one another and formed on a component part (19, 19') stationary relative to the pillow block (7) and on a component part (30, 30') displaceable relative to the pillow block (7) in the direction of the pivot axis (16) against the force of a compression spring (28), the pillow block (7) has an inner chamber (17), in which the compression spring (28), a driver is non-rotatably connected with the support arm (4), on which driver (44) the displaceable component part (30') is guided in a manner to be non-rotatable but displaceable in the direction of the pivot axis (16).

19. A holding device according to claim 18, wherein the driver is in the form of a driver sleeve (44) non-rotatably connected with the support arm by means of a plug connection (46, 47).

20. A holding device according to claim 19, wherein the driver sleeve (44) has a flange (45) non-rotatably connected with the support arm (4) by means of a groove-and-tongue connection (46, 47).

21. A holding device according to claim 18, wherein the component part displaceable in the direction of the pivot axis (16) is in the form of a locking sleeve (30') non-rotatably guided on a driving section (50) of the driver (44).

* * * * *